US009459698B2

(12) United States Patent
Lee (10) Patent No.: US 9,459,698 B2
(45) Date of Patent: Oct. 4, 2016

(54) GESTURE BASED POWER MANAGEMENT SYSTEM AND METHOD (71) Applicant: TCL RESEARCH AMERICA INC., San Jose, CA (US)

(72) Inventor: Janghwan Lee, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 8 days.

(21) Appl. No.: 14/565,839

(22) Filed: Dec. 10, 2014

(65) Prior Publication Data

US 2016/0170490 A1 Jun. 16, 2016

(51) Int. Cl.
 G09G 5/00 (2006.01)
 G06F 3/01 (2006.01)
 G06K 9/00 (2006.01)
 G06F 1/16 (2006.01)

(52) U.S. Cl.
 CPC ............... G06F 3/017 (2013.01); G06F 1/163 (2013.01); G06K 9/00355 (2013.01); *G09G 2330/021* (2013.01)

(58) Field of Classification Search
 CPC ........ G06F 1/163; G06F 3/011; G06F 3/017; G06F 3/0346; G06K 9/00355; G09G 2330/021
 See application file for complete search history.

(56) References Cited

U.S. PATENT DOCUMENTS

| 6,513,532 | B2* | 2/2003 | Mault | A61B 5/02055 128/921 |
|---|---|---|---|---|
| 8,040,758 | B1* | 10/2011 | Dickinson | A61B 5/02405 368/11 |
| 9,009,516 | B1* | 4/2015 | Gabayan | G06F 1/3206 702/141 |
| 2005/0171410 | A1* | 8/2005 | Hjelt | A61B 5/00 600/300 |
| 2008/0171636 | A1* | 7/2008 | Usui | A63B 24/0062 482/8 |
| 2008/0254824 | A1* | 10/2008 | Moraes | A45F 5/00 455/556.1 |
| 2009/0195497 | A1* | 8/2009 | Fitzgerald | G06F 1/3203 345/156 |
| 2010/0331145 | A1* | 12/2010 | Lakovic | G04F 10/00 482/8 |
| 2013/0106603 | A1* | 5/2013 | Weast | G06F 1/163 340/539.11 |
| 2013/0191741 | A1* | 7/2013 | Dickinson | G06F 1/163 715/702 |
| 2014/0347391 | A1* | 11/2014 | Keane | G06T 19/006 345/633 |
| 2015/0111558 | A1* | 4/2015 | Yang | G04G 21/04 455/418 |
| 2015/0301574 | A1* | 10/2015 | Kim | G06F 3/017 345/156 |
| 2016/0006678 | A1* | 1/2016 | Jung | G06F 3/048 726/19 |
| 2016/0018900 | A1* | 1/2016 | Tu | G06F 1/3234 345/156 |

* cited by examiner

Primary Examiner — Joe H Cheng
(74) Attorney, Agent, or Firm — Anova Law Group, PLLC (57) ABSTRACT A gesture based power management method for a wearable device is provided. The method includes establishing a mapping relationship between a set of pre-defined gestures including at least a lookup gesture and a set of power management functions including at least a function for turning on a display screen of the wearable device. The method also includes receiving motion information from a plurality of sensors and determining whether the display screen of the wearable device is on. Further, the method includes counting down a timeout counter when the display screen of the wearable device is on, determining whether the motion information indicates a specific pre-defined gesture when the display screen of the wearable device is off, and performing a power management function corresponding to the specific pre-defined gesture when the motion information indicates the specific pre-defined gesture.

20 Claims, 6 Drawing Sheets

GESTURE BASED POWER MANAGEMENT SYSTEM AND METHOD

FIELD OF THE INVENTION

The present invention generally relates to the field of human-computer interaction technologies and, more particularly, to a gesture based power management system and method for a wearable device.

BACKGROUND

Over the last decade, the rapid improvement of wearable smart device technologies brings a wide variety of applications. Most of these advanced technologies have been driven by the popularity of pocket-sized devices, such as smartphones and MP3 players. However, few of advanced technologies cross over into small wearable devices, such as smartwatches. Because of device size and battery constraints, wearable electronic devices often have limited functionalities and typically use low power components.

Motion sensors, such as inertial sensors like accelerometers or gyroscopes, can be used in wearable devices. The accelerometers can be used for measuring linear acceleration and gyroscopes can be used for measuring angular velocity of a moved handheld electronic device. Many existing wearable smart devices tend to use more than a sensor in the smart device to provide information that users might be interested in. A variety of devices, systems and applications seek to take advantage of motion sensor detection, but it is challenging to detect a gesture with 3-axis accelerometer motion sensors for sufficient accuracy. Some devices having accelerometers and gyroscopes may separate a set of accelerometers and a set of gyroscopes into two distinct units. The two sets of sensors may be disposed relatively far from each other, which introduces spatial separation between the two sets of sensors, making unified motion detection more difficult and less accurate. Some devices integrate a display subsystem to permit direct interaction with users.

Because most of wearable smart devices are operated on battery power, a power management module of the smart device is one of major components for wearable smart device design. Current power management systems for wearable smart devices are often inefficient to control power consumption of the wearable smart devices.

The disclosed methods and systems are directed to solve one or more problems set forth above and other problems.

BRIEF SUMMARY OF THE DISCLOSURE

One aspect of the present disclosure includes a gesture based power management method for a wearable device. The method includes establishing a mapping relationship between a set of pre-defined gestures including at least a lookup gesture and a set of power management functions including at least a function for turning on a display screen of the wearable device. The method also includes receiving motion information from a plurality of sensors and determining whether the display screen of the wearable device is on. Further, the method includes counting down a timeout counter when the display screen of the wearable device is on, determining whether the motion information indicates a specific pre-defined gesture when the display screen of the wearable device is off, and performing a power management function corresponding to the specific pre-defined gesture when the motion information indicates the specific pre-defined gesture.

Another aspect of the present disclosure includes a gesture based power management system for a wearable device. The system includes a mapping relationship establishment module configured to establish a mapping relationship between a set of pre-defined gestures including at least a lookup gesture and a set of power management functions including at least a function for turning on a display screen of the wearable device. The system also includes a receiving module configured to receive motion information from a plurality of sensors. Further, the system includes a detection module configured to determine whether the display screen of the wearable device is on, where when the display screen of the wearable device is on, a timeout counter is counted down; when the display screen of the wearable device is off, whether the motion information indicates a specific pre-defined gesture is determined; and when the motion information indicates the specific pre-defined gesture, a power management function corresponding to the specific pre-defined gesture is performed.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

To save the power on wearable devices, one approach is to use only one accelerometer until a significant motion is detected to start detecting other meaningful activities using all sensors because the accelerometer uses less power than other sensors in the device. Also, it is desired to know when to power on a display screen, such as a Liquid Crystal Display (LCD) panel, in the wearable smart device because the display screen is a major source of power usage. Often, the smart device has a LCD panel to show the information to users including time and date information. If a gesture from a user is detected when the user wants to see the information through the display screen, the display screen may be turned on when the gesture is detected in order to save power consumption of the wearable smart device.

Figure 1:
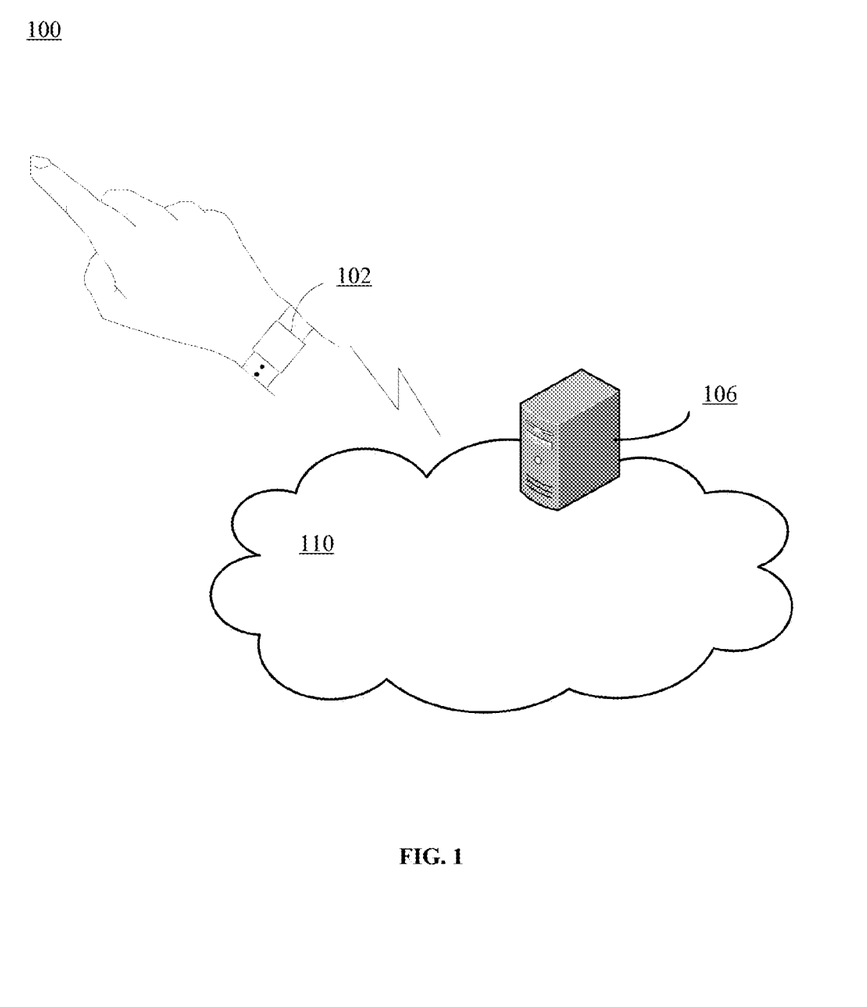
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a smart wearable device 102, a server 106, and a network 110. Other devices may also be included.

Smart wearable device 102 may include any appropriate type of smart wearable device, such as a smartwatch, a pair of smartglasses, a fitness tracker, etc.

Further, the server 106 may include any appropriate type of server computer or a plurality of server computers for providing contents to smart wearable device 102. The server 106 may also facilitate communication, data storage, and data processing for smart wearable device 102. The server 106 may also perform analysis operations (e.g., health trend analysis) for a target population based on the received data from a large number of smart wearable device's users and send back analysis results to smart wearable device's users.

Smart wearable device 102 and server 106 may communicate with each other through one or more communication networks 110, such as a cable network, a phone network, a satellite network, and/or the Internet, etc.

A user may interact with smart wearable device 102 using gestures to browse information and to perform other activities of interest, or the user may simply use hand or gestures to control smart wearable device 102 by motion sensors. Smart wearable device 102, and/or server 106 may be implemented on any appropriate computing circuitry platform.

Figure 2:
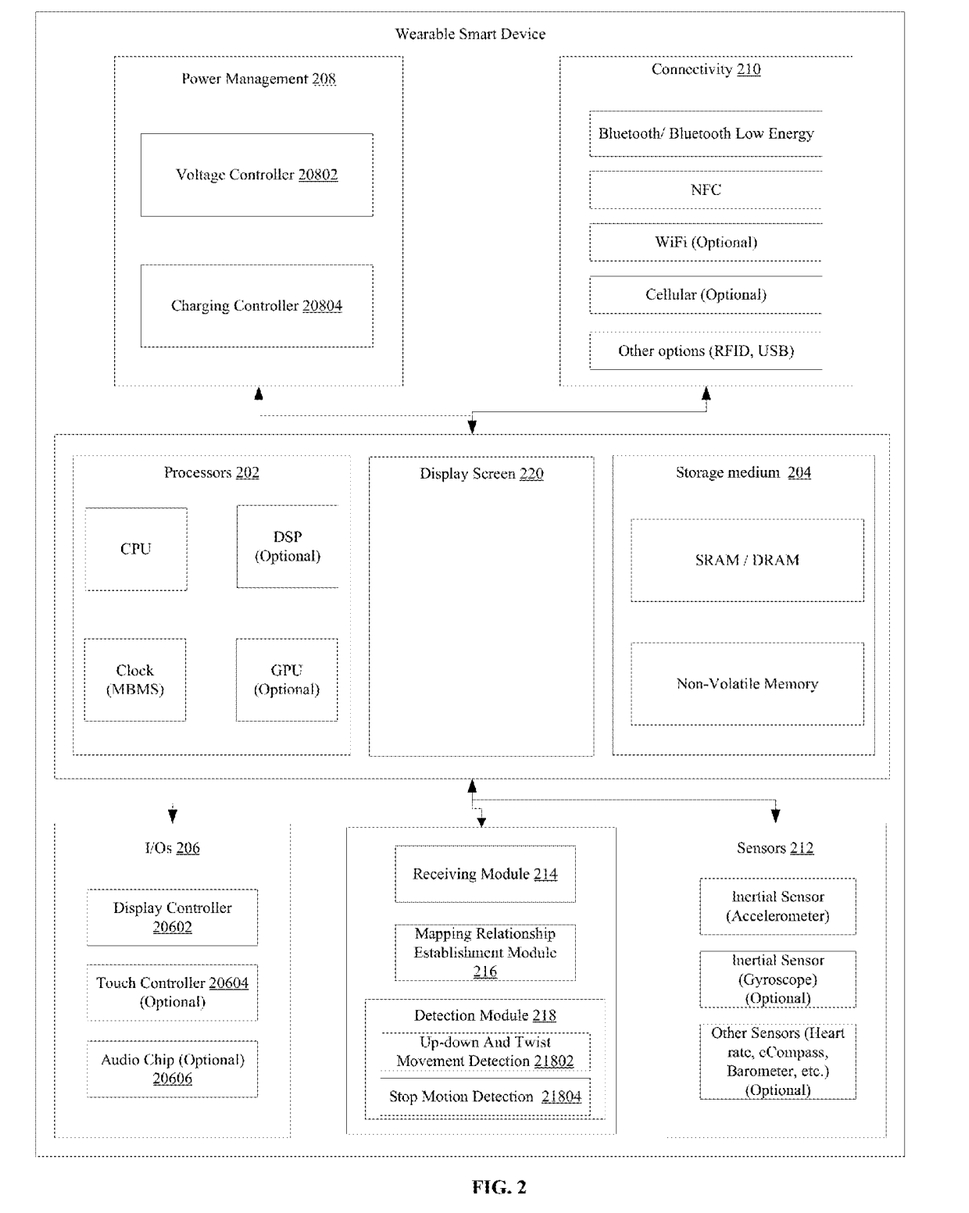
FIG. 2 illustrates a block diagram of an exemplary smart wearable device consistent with the disclosed embodiments.

FIG. 2 illustrates a block diagram of an exemplary smart wearable device consistent with the disclosed embodiments. A smart wearable device may include a processor 202, storage medium 204, input/output (I/O) devices 206, a power management module 208, connectivity modules 210, sensors 212, a receiving module 214, a mapping relationship establishment module 216, a detection module 218, and a display screen 220. Certain devices may be omitted and other devices may be included.

Processor 202 may include any appropriate processor or processors. Further, processor 202 can include multiple cores for multi-thread or parallel processing. The processor 202 may include at least one Central Processing Unit (CPU) and a clock module. More than one CPUs may also be included in the smart wearable device. The number of CPUs is not limited herein. Some optional components may be included, such as a Digital Signal Processor (DSP) and a Graphics Processing Unit (GPU). The DSP may also be a part of sensor module to process a sensor input signal.

In one embodiment, the CPU may be an ARM processor. The clock component may be used as an internal timing device for the wearable smart wearable device. A microcontroller may also include a clock interface, which is connected to the power management module 208 to control a CPU speed according to a power state of the device.

Storage medium 204 may include memory modules, such as a random access memory (RAM) and a non-volatile memory, etc. Storage medium 204 may store computer programs for implementing various processes when the computer programs are executed by processor 202. For example, the device may include an SRAM inside the microcontroller for a small embedded system, and an external Dynamic Random Access Memory (DRAM) interface. The RAM may be used as a main memory for the processors for supporting execution of software routines and other selective storage functions. The non-volatile memory is capable of holding instructions and data without power and may store the software routines for controlling modules. The non-volatile memory may be a flash memory or a read only memory (ROM).

I/O devices 206 may include a display controller 20602, a touch controller 20604, and an optional audio chip 20606. The display controller 20602 may access RAM and transfer processed data, such as time and data and/or a user interface, to display screen 220 (e.g. a touch screen) for display. Touch controller 20604 may interface with the display screen 220 (e.g. a touch screen) to detect touches and touch locations and pass the information on to processor 202 for determination of user interactions. The audio chip 20606 can be used to generate a simple tone for indicating some events, or may support full audio processing according to system requirement. An optional component may include a microphone interface to interface an optional microphone in the device to get the command by voice.

In one embodiment, the device can be implemented without sound capability. That is, no audio chip speaker or microphone is included. A touch screen controller may interface with the touch screen to detect touch locations and pass the information on to the processor 202. The display screen 220 can also be implemented without a touch interface. Display screen 220 may include any appropriate display screen. For example, display screen 220 may be an Organic Light Emitting Diode (OLED) touch screen display or a Liquid Crystal Display (LCD) touch screen display.

Power management module 208 communicates with the processor 202 and coordinates power management for the device while the device draws power from a battery (e.g. a rechargeable lithium ion battery) during normal operations. The power management module 208 may include a voltage controller and a charging controller for recharging the battery. The voltage controller 20802 may regulate a battery voltage to the rest of the device. The charging controller 20804 may manage appropriate voltage levels to properly charge the battery. Power management module 208 may be a part of microcontroller with the processor or a separate microcontroller. The voltage controller 20802 can have more than a voltage level to support a sleep or suspended mode of the device.

Connectivity modules 210 may include components for supporting one-way or two-way wireless and/or wire communications. The wearable device may use Bluetooth low energy as a main communication mean to outside world. However, other communication modes (e.g., Near Field Communication (NFC), wireless fidelity (Wi-Fi), Cellular, Radio Frequency Identification Devices (RFID), and Universal Serial Bus (USB)) may be used. The communication modes are not limited herein.

The mapping relationship establishment module 216 is configured to establish a mapping relationship between a set of pre-defined gestures including at least a lookup gesture and a set of power management functions including at least a function for turning on a display screen of the wearable device.

A plurality of sensors 212 are configured to establish a three-dimensional (3D) coordinate system, including an X axis direction being from left to right horizontally, a Y axis direction being from bottom to top vertically, and a Z axis direction being from back to front and perpendicular to a display screen of a wearable device.

The sensors 212 may include any appropriate devices that can take information of outside world and supply the obtained information to the devices. The sensors 212 can also function with other components to provide a user or environmental input and feedback to the user. The sensors 212 may include at least one of each of an inertial sensor and any number of optional sensors. The inertial sensor can include a three-axial Micro-Electro-Mechanical System (MEMS) accelerometer that is used to measure information, such as position, motion, tilt, etc. In static conditions, the MEMS accelerometer is useful for determining the vertical direction associated to the gravitational acceleration. The inertial sensor may also include a three-axial gyroscope to provide information about movement of the wearable device, such as real-time angular velocity readings. Gyroscope readings are integrated to compute the angular displacements. Other sensors (e.g., a three-axial MEMS magnetic field sensor, a heart rate sensor, an eCompass sensor, a barometer sensor, a blood pressure sensor, etc.) may also be included in the device.

Further, the receiving module 214 may be configured to receive motion information from the plurality of sensors 212. The receiving module 214 may receive acceleration information in the 3-axis directions from the plurality of sensors. The received acceleration information is filtered using Low Pass Filtering (LPF) to remove noises and obtain a gravity component.

The detection module 218 may be configured to determine whether the display screen 220 of the wearable device is on, where when the display screen 220 of the smart wearable device is on, a timeout counter is counted down; when the display screen 220 of the smart wearable device is off, it is determined whether the motion information indicates a specific pre-defined gesture (e.g., a lookup gesture); and when the motion information indicates the specific pre-defined gesture, a power management function corresponding to the specific pre-defined gesture is performed.

The detection module 218 may further include an up-down and twist movement detection submodule 21802 and a stop motion detection submodule 21804.

The up-down and twist movement detection submodule 21802 is configured to detect up-down and twist movements of the smart wearable device by calling a subroutine for detecting the up-down and twist movements.

The stop motion detection submodule 21804 is configured to detect a stop motion of the smart wearable device by calling a subroutine for detecting the stop motion.

Figure 3:
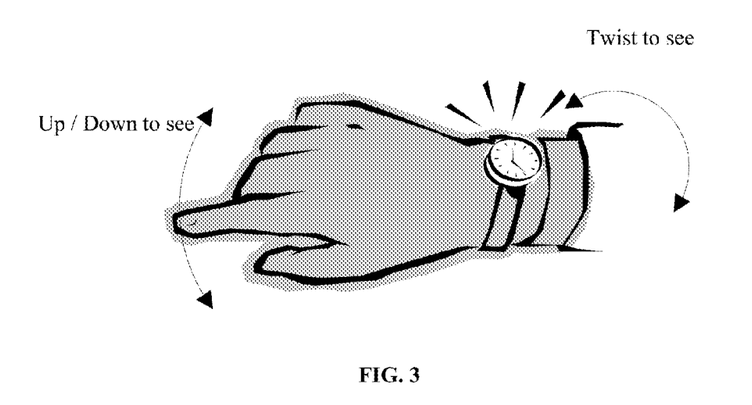
FIG. 3 illustrates a schematic diagram of an exemplary gesture to be detected consistent with the disclosed embodiments.

FIG. 3 illustrates a schematic diagram of an exemplary gesture to be detected consistent with the disclosed embodiments. The gesture to be detected is defined as two initial movements and a stop motion to take a look for information (i.e., a lookup gesture). The two initial movements include moving up-down to take a smart wearable device in front of a user's eyes and twisting the smart wearable device to bring a display screen (e.g., a touch screen) of the smart wearable device in front of the user's eyes.

When the smart wearable device is a smartwatch, if the lookup gesture (a sequence of movements) is detected, it may indicate that a user of the smartwatch wants to see information displayed on the display screen of the smartwatch. Therefore, the display screen of the smartwatch is turned on to show the information. While the second motion (i.e., a stop motion) is being detected, the user does not intend to see the display screen if the user keeps the up-down and/or twist motion. In addition to this scenario, an angle of the display screen may be detected because the user may not watch the display screen when the display screen points to certain angles.

Figure 4:
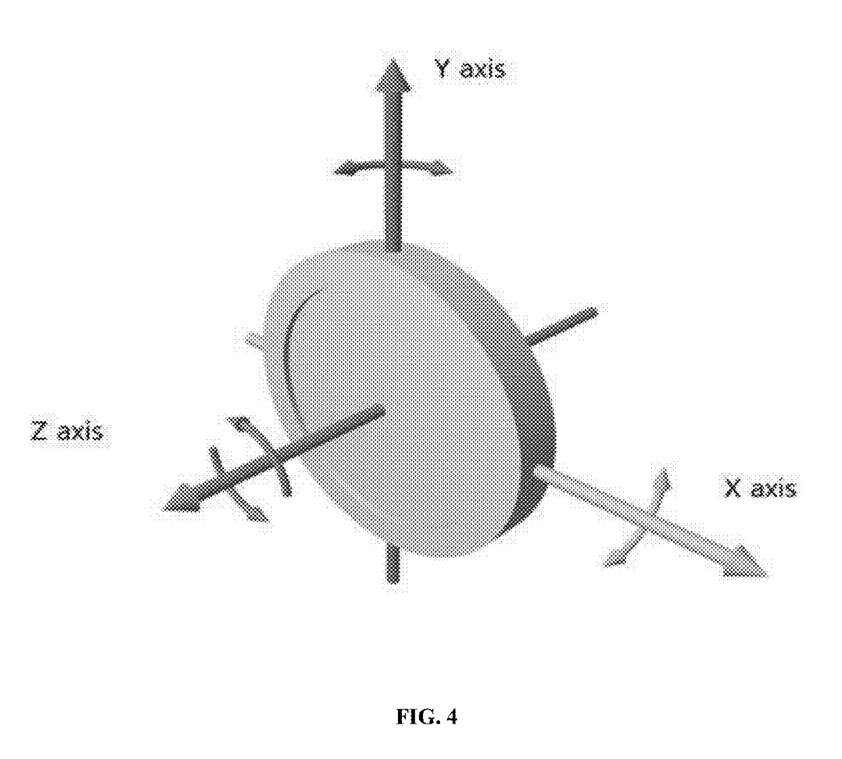
FIG. 4 shows three axes of a smart wearable device consistent with the disclosed embodiments.

FIG. 4 shows three axes of a smart wearable device consistent with the disclosed embodiments. As shown in FIG. 4, a three-dimensional (3D) coordinate system on a smart wearable device (e.g., a smartwatch) is established, where an X axis (i.e., horizontal axis) direction is from left to right horizontally; a Y axis (i.e., vertical axis) direction is from bottom to top vertically; and a Z axis direction is from back to front and perpendicular to a display screen of the smart wearable device. If the Z axis of the smart wearable device shares the direction of the display screen as shown in FIG. 4, a stop motion is detected by tracking the direction of the Z axis. That is, the direction of the display screen (i.e., the center of the Z axis) is not out of range to be aligned to the user's eyes for a predefined waiting period, the stop motion is detected.

Figure 5:
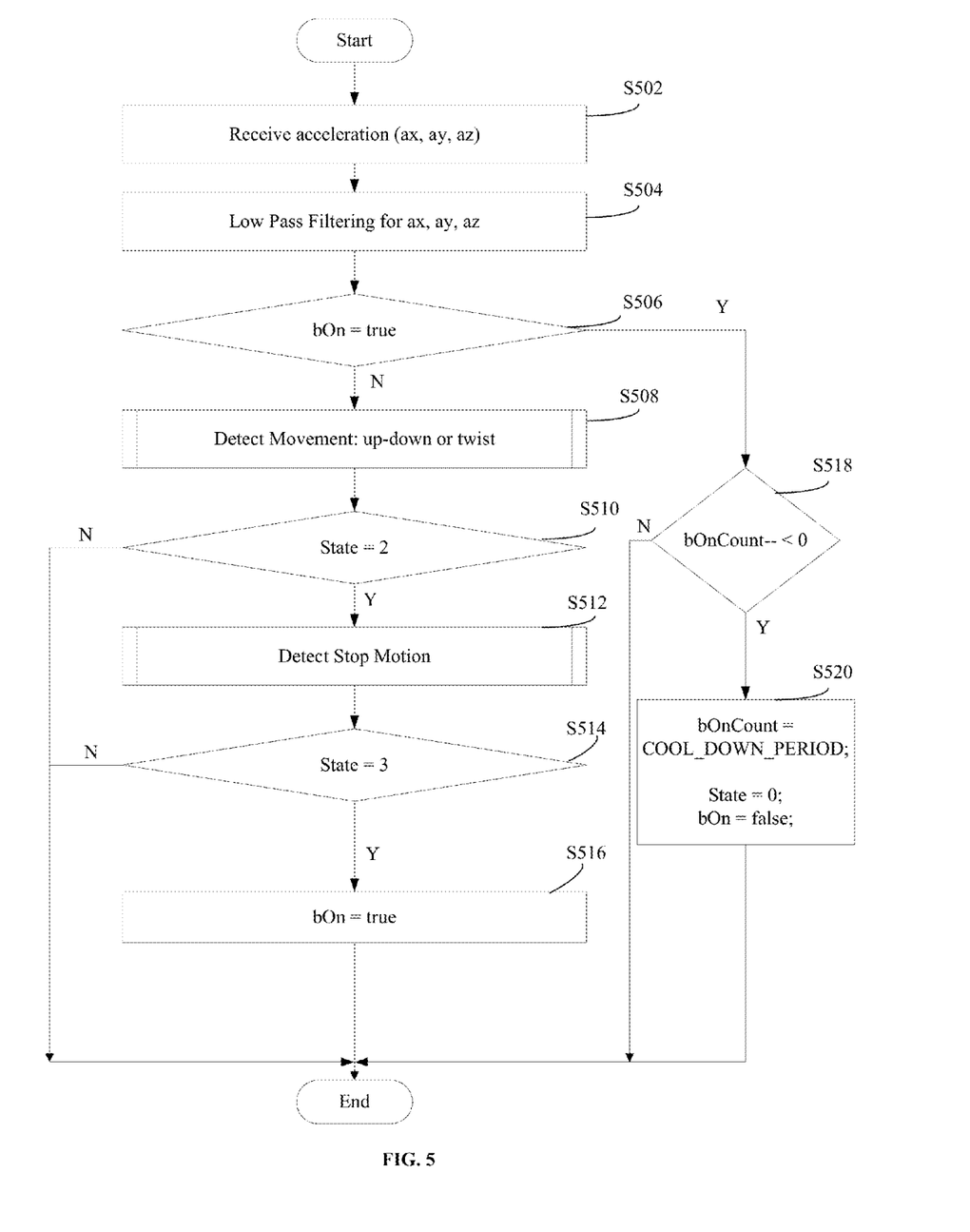
FIG. 5 illustrates a flowchart of an exemplary gesture detection process consistent with the disclosed embodiments.

A mapping relationship between a set of pre-defined gestures and a set of power management functions needs to be established. The set of pre-defined gestures may include at least one lookup gesture. Other swipe gestures (e.g., a swipe gesture) may also be included in the set of pre-defined gestures. The set of power management functions may include at least one function for turning on the display screen of the wearable device. Other power management functions (e.g., adjusting screen brightness) may also be included in the set of power management functions. In one application scenario, a user views time and/or his/her health index (e.g., heart rate) by using a smartwatch on his/her wrist. The power for the display screen of the smartwatch may be controlled by detecting the lookup gesture which indicates that the user wants to check information on the display screen. That is, a mapping relationship between the lookup gesture and the function for turning on the display screen of the wearable device is established. FIG. 5 illustrates a flowchart of an exemplary gesture detection process consistent with the disclosed embodiments.

As shown in FIG. 5, at the beginning, motion information from a plurality of sensors is received (S502). That is, acceleration (ax, ay, az) in the 3-axis directions from the inertial sensors is received. A low pass filter is designed and used for preprocessing the received acceleration information. The received acceleration information is filtered using Low Pass Filtering (LPF) to remove noises and obtain a gravity component (S504). Then, a flag bOn is checked to determine whether a display screen is on (S506).

If the flag bOn is not true, it indicates that the display screen is off and a detection routine for detecting a lookup gesture (i.e., two initial movements including an up-down movement and a twist movement, and a stop motion shown in FIG. 3) needs to be run. That is, whether the motion information indicates a specific pre-defined gesture is determined. Then, movements (i.e., an up-down movement or a twist movement) are detected (S508). To detect the up-down movement, an X axis angle (i.e., the direction of the display screen on the Y axis and the Z axis) needs to be monitored. This movement detection may be implemented by tracking gyroscope angle speed for the X axis or tracking gravity applied to an accelerometer on the Y axis and the Z axis to calculate change of the angle on the X axis.

Specifically, for tracking gyroscope angle speed for the X axis, the angular speed can be integrated on the X axis to get the movement. The angular movement can be easily calculated by tracking the gravity on the Z axis and the Y axis from the accelerometer. To obtain the gravity portion of acceleration from the accelerometer, the low pass filter is used to eliminate the linear acceleration portion. When the change of the angle is more than a predefined threshold on the X axis, the movement is detected and the process goes to S510.

The detection of the twist movement is similar with the detection of the up-down movement. The only difference is that the detection of the twist movement needs to track the change of the angle for the Y axis instead of the X axis. For using the accelerometer, the acceleration on the Z axis and the X axis needs to be tracked to obtain the gravity on the Z axis and the X axis.

Figure 6:
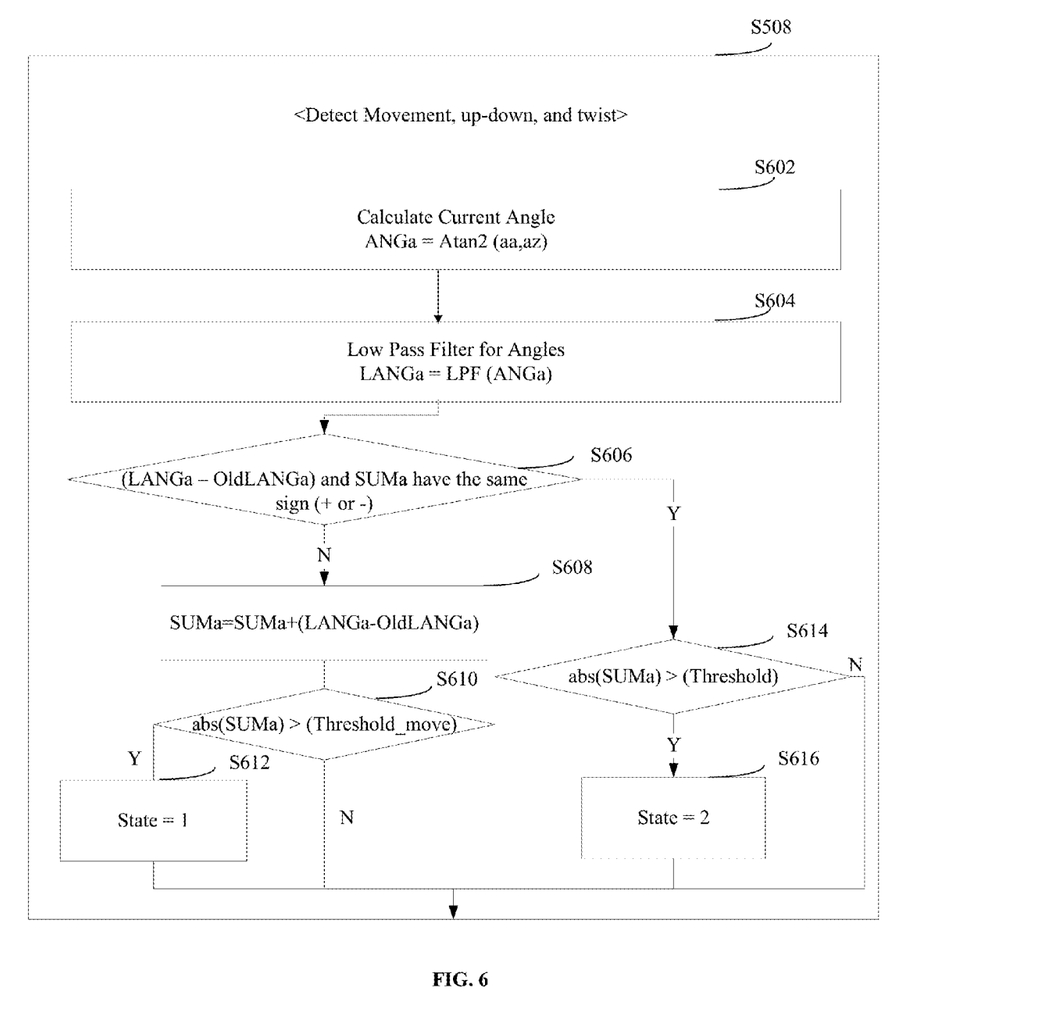
FIG. 6 illustrates a flowchart of an exemplary detection process for up-down and twist movements consistent with the disclosed embodiments.

FIG. 6 illustrates a flowchart of an exemplary detection process for up-down and twist movements consistent with the disclosed embodiments. As shown in FIG. 6, change of an angle is monitored for the Y axis and the X axis. That is, a subroutine shown in FIG. 6 needs to be run twice for the Y axis and the X axis, respectively. In the flowchart in FIG. 6, a parameter aa in Atan2 (aa, az) needs to be replaced with ax and ay respectively to calculate the angle for the Y axis and the X axis. All subscription "a" s in the parameters need to be replaced with y and x. For example, ANGa needs to be replaced with ANGx and ANGy, and LANGa needs to be replaced with LANGx and LANGy. At the beginning, a current angle is calculated using Atan2 (aa,az) (S602), that is, ANGa=Atan2 (aa,az). Then, a low pass filter is used for preprocessing the current angle (S604), that is, LANGa=LPF (ANGa). The algebraic sign (i.e., "+" or "-") of the difference (that is, LANGa-OldLANGa) between the updated angle and an old angle is compared with the algebraic sign of an accumulated sum (i.e., SUMa) of change of the angle (S606). If the comparison result is not the same, the subroutine goes to S608. If the comparison result is the same, the subroutine goes to S614.

In S608, the difference (that is, LANGa-OldLANGa) between the updated angle and the old angle is added to SUMa to obtain a new SUMa. That is, SUMa=SUMa+ (LANGa-OldLANGa). The absolute value of the new SUMa (i.e., abs(SUMa)) is compared with a predefined movement threshold Threshold_move (S610). The Threshold_move is a predefined threshold for detecting a significant movement before a waiting period for stop motion is expired.

When the change of the angle is greater than Threshold_move (that is, abs(SUMa)>Threshold_move), the movement is detected and the detection state is set to 1 (S612). That is, State=1.

When the change of the angle is not greater than the Threshold_move (that is, abs(SUMa)<=Threshold_move), the subroutine is ended.

In S614, the subroutine determines whether the absolute value of the SUMa is greater than a predefined threshold (i.e., Threshold). When the change of the angle is greater than the Threshold, the movement is detected and the detection state is set to 2 (S616). That is, State=2. The subroutine is ended.

Returning to FIG. 5, in S510, it is determined whether the value of the detection state is equal to 2. If the value of the detection state is equal to 2, the stop motion needs to be detected in S512. If the value of the detection state is not equal to 2, the process is ended.

Therefore, the next motion to be detected is the stop motion and the stop motion needs to be in that state longer than a predefined waiting period, W. A small movement within a predefined range is allowed in order to cover noises and non-significant movements. During the waiting period, if one of the up-down movement and the twist movement is detected, the process restarts the waiting period. If the direction of the display screen (i.e., the center of the Z axis) is out of range to be aligned to the user's eyes, the process resets the detection state and restarts detecting the movements. To detect whether the state of the display screen is out of range, the gravity on the X axis is monitored.

Figure 7:
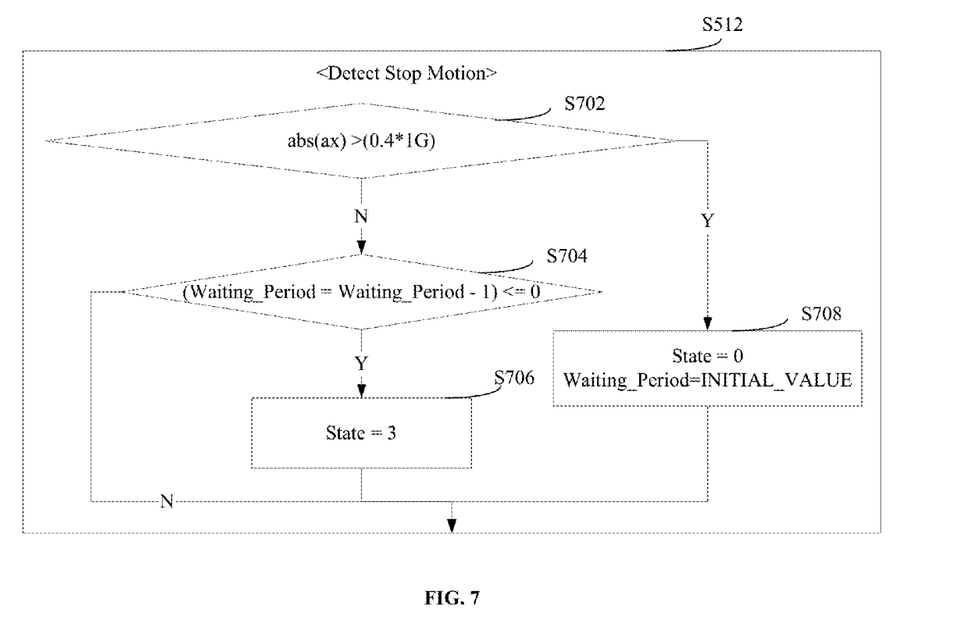
FIG. 7 illustrates a flowchart of an exemplary detection process for a stop motion consistent with the disclosed embodiments.

FIG. 7 illustrates a flowchart of an exemplary detection process for a stop motion consistent with the disclosed embodiments. As shown in FIG. 7, a subroutine determines whether the absolute value of acceleration on the X axis (i.e., ax) is greater than a predefined value (e.g., 0.4*1G) (S702). If the absolute value of ax is not greater than the predefined value, a waiting period is decreased by 1 and the subroutine further detects whether the decreased waiting period is not greater than 0 (S704). If the decreased waiting period is not greater than 0, the stop motion is detected and the value of the detection state is set to 3 (S706). If the decreased waiting period is greater than 0, the subroutine is ended. If the absolute value of ax is greater than the predefined value (e.g., 0.4*1G), the value of the detection state is reset to 0 and the waiting period is reset to an initial value (S708).

The subroutine monitors the Z axis angle using the gravity component on the X axis and movements (i.e., up-down and twist movements) during the waiting period. Monitoring the Z axis angle is to check the alignment of the display screen with the user's eyes. When the direction of the display screen is tilted toward a positive or negative x coordinate, it is hard to believe that the user intents to see the display screen of the smartwatch. Monitoring movements is implemented by calling the subroutine for detecting the up-down and twist movements in the predefined waiting period (e.g., 200~400 ms). If the movement is detected in the subroutine, the detection state is changed to 1 or 2. That is, State=1 or State=2. If the stop motion state is not maintained or a new up-down or twist movement is detected during the predefined waiting period, the process restarts counting for the waiting period. Thus, the process detects the moment when the user wants to take a look the display screen of the smartwatch.

Returning to FIG. 5, whether the value of the detection state is equal to 3 is determined (S514). If the value of the detection state is not equal to 3, the process is ended. If the value of the detection state is equal to 3, a flag bOn is set to true (S516). That is, the lookup gesture is detected and the display screen is turned on.

Then, the user may view the time displayed on the display screen, or may touch a "health index" icon to open a "health index" application installed on the smartwatch. Because a heart rate sensor in the smartwatch can count the user's pulses in real time, the user's heart rate can be displayed in real time on the touch screen of the smartwatch based on the counting result. Thus, the user may view his/her heart rate on the touch screen of the smartwatch. After touching to choose an option, the user may also see more details in health index. At the same time, the smartwatch sends the received counting result and the user's current motion status (e.g., static, walking, running, etc.) to a network server, such that the network server can evaluate and analyze the user's physical fitness based on the counting result in combination with the user's motion status.

In addition, the network server also stores the counting result as the sample data, such that the network server can perform a health trend analysis for a target population based on the pulse counting results of a large number of smartwatch's users.

If the flag bOn is true, it indicates that the screen is on. At the same time, a timeout counter (i.e., bOnCount) is counted down. Then, whether bOnCount is less than 0 is determined (S518). If bOnCount is less than 0, bOnCount and the detection state are reset to the initial values (S520). That is, bOnCount is reset to COOL_DOWN_PERIOD and the State is reset to 0. At the same time, the flag bOn is cleared to restart the detection process. When the flag bOn is false, it indicates that a detection process needs to be run.

The disclosed methods may control the power for the display screen by defining and detecting the lookup gesture which indicates that the user wants to check information on the display screen. Thus, energy consumption of the smart wearable device is saved, and better user experience is provided through high detection efficiency.

It is understood that the disclosed model is not limited to the smartwatch. The disclosed systems and methods can also be applied to any smart devices, such as smart phones, tablets, smartglasses, and so on. The smart wearable device can be also useful for medical geriatric or ambulatory monitoring of individuals in order to assess levels of independence. The disclosed methods can also be applied as the core function for other systems, such as activity tracking systems, health and fitness monitoring systems, and so on.

Further, although the method is disclosed for illustrative purposes, similar concept and approach can be applied to other smart systems. Other applications, advantages, alternations, modifications, or equivalents to the disclosed embodiments are obvious to those skilled in the art.

What is claimed is:

1. A gesture based power management method for a wearable device, comprising:
   establishing a mapping relationship between a set of pre-defined gestures including at least a lookup gesture and a set of power management functions including at least a function for turning on a display screen of the wearable device, wherein the lookup gesture comprises an up-down movement, a twist movement, and a stop motion in a sequence;
   receiving motion information from a plurality of sensors;
   determining whether the display screen of the wearable device is on;
   when the display screen of the wearable device is on, counting down a timeout counter;
   when the display screen of the wearable device is off, determining whether the motion information indicates a specific pre-defined gesture, comprising determining the lookup gesture by detecting the up-down movement, the twist movement, and the stop motion sequentially; and
   when the motion information indicates the specific pre-defined gesture, performing a power management function corresponding to the specific pre-defined gesture.

2. The method according to claim 1, wherein receiving motion information from a plurality of sensors further includes:
   receiving acceleration information in 3-axis directions from the plurality of sensors, wherein the 3-axis directions include an X axis direction being from left to right horizontally, a Y axis direction being from bottom to top vertically, and a Z axis direction being from back to front and perpendicular to the display screen of the wearable device.

3. The method according to claim 1, wherein determining whether the motion information indicates a specific pre-defined gesture when the display screen of the wearable device is off further includes:
   detecting the lookup gesture by calling detection subroutines; and
   based on a detection result of the lookup gesture, changing a value of a detection state.

4. The method according to claim 3, wherein changing a value of a detection state based on a detection result of the lookup gesture further includes:
   based on a detection result of the movements, changing the value of the detection state;
   based on the value of the detection state, determining whether a stop motion is detected; and
   based on a detection result of the stop motion, changing the value of the detection state.

5. The method according to claim 1, wherein performing a power management function corresponding to the specific pre-defined gesture further includes:
   performing the function for turning on the display screen of the wearable device corresponding to the lookup gesture when the motion information indicates the lookup gesture.

6. A gesture based power management method for a wearable device, comprising:
   establishing a mapping relationship between a set of pre-defined gestures including at least a lookup gesture and a set of power management functions including at least a function for turning on a display screen of the wearable device;
   receiving motion information from a plurality of sensors;
   determining whether the display screen of the wearable device is on;
   when the display screen of the wearable device is on, counting down a timeout counter;
   when the display screen of the wearable device is off, determining whether the motion information indicates a specific pre-defined gesture, comprising:
      detecting up-down and twist movements of the wearable device by calling a subroutine for detecting the up-down and twist movements, and
      detecting a stop motion of the wearable device by calling a subroutine for detecting the stop motion; and
   when the motion information indicates the specific pre-defined gesture, performing a power management function corresponding to the specific pre-defined gesture.

7. The method according to claim 6, wherein detecting up-down and twist movements of the wearable device by calling a subroutine for detecting the up-down and twist movements further includes:
   calculating a current angle;
   preprocessing the current angle using a low pass filter;
   comparing an algebraic sign of a difference between the updated angle and an old angle with an algebraic sign of an accumulated sum of change of the angle;
   when the algebraic sign of the difference between the updated angle and the old angle is the same as the algebraic sign of the accumulated sum of the change of the angle, adding the difference between the updated angle and the old angle to the accumulated sum of the change of the angle to obtain a new accumulated sum and determining whether an absolute value of the new accumulated sum of the change of the angle is greater than a predefined movement threshold; and
   when the algebraic sign of the difference between the updated angle and the old angle is different from the algebraic sign of the accumulated sum of change of the angle, determining whether the absolute value of the accumulated sum of the change of the angle is greater than a predefined threshold.

8. The method according to claim 7, wherein determining whether an absolute value of the new accumulated sum of the change of the angle is greater than a predefined movement threshold further includes:
   when the absolute value of the new accumulated sum of the change of the angle is greater than the predefined movement threshold, changing the value of the detection state to 1; and when the absolute value of the new accumulated sum of the change of the angle is not greater than the pre-defined movement threshold, exiting the subroutine for detecting the up-down and twist movements.

9. The method according to claim 7, wherein determining whether the absolute value of the accumulated sum of the change of the angle is greater than a predefined threshold further includes:
when the absolute value of the accumulated sum of the change of the angle is greater than the predefined threshold, changing the value of the detection state to 2; and
when the absolute value of the accumulated sum of the change of the angle is not greater than the predefined threshold, exiting the subroutine for detecting the up-down and twist movements.

10. The method according to claim 6, wherein detecting a stop motion of the wearable device by calling a subroutine for detecting the stop motion further includes:
determining whether an absolute value of acceleration on an X axis is greater than a predefined value;
when the absolute value of the acceleration on the X axis is not greater than the predefined value, decreasing a waiting period by 1 and detecting whether the decreased waiting period is not greater than 0, wherein:
when the decreased waiting period is not greater than 0, the value of the detection state is set to 3; and
when the decreased waiting period is greater than 0, the subroutine for detecting the stop motion is exited; and
when the absolute value of the acceleration on the X axis is greater than the predefined value, resetting the value of the detection state to 0 and resetting the waiting period to an initial value.

11. A gesture based power management system for a wearable device, comprising:
a mapping relationship establishment module configured to establish a mapping relationship between a set of pre-defined gestures including at least a lookup gesture and a set of power management functions including at least a function for turning on a display screen of the wearable device, wherein the lookup gesture comprises an up-down movement, a twist movement, and a stop motion in a sequence;
a receiving module configured to receive motion information from a plurality of sensors; and
a detection module configured to determine whether the display screen of the wearable device is on, wherein:
when the display screen of the wearable device is on, a timeout counter is counted down;
when the display screen of the wearable device is off, whether the motion information indicates a specific pre-defined gesture is determined,
wherein the detection module is further configured to determine the lookup gesture by detecting the up-down movement, the twist movement, and the stop motion sequentially; and
when the motion information indicates the specific pre-defined gesture, a power management function corresponding to the specific pre-defined gesture is performed.

12. The system according to claim 11, wherein the receiving module is further configured to:
receive acceleration information in 3-axis directions from the plurality of sensors, wherein the plurality of sensors are configured to establish a three-dimensional (3D) coordinate system, including an X axis direction being from left to right horizontally, a Y axis direction being from bottom to top vertically, and a Z axis direction being from back to front and perpendicular to the display screen of the wearable device.

13. The system according to claim 11, wherein the detection module is further configured to:
when the display screen of the wearable device is off, detect the lookup gesture by calling detection subroutines;
change a value of a detection state based on a detection result of the lookup gesture; and
determine whether the display screen of the wearable device is turned on based on the value of the detection state.

14. The system according to claim 13, wherein the detection module further includes:
an up-down and twist movement detection submodule configured to detect up-down and twist movements of the wearable device by calling a subroutine for detecting the up-down and twist movements; and
a stop motion detection submodule configured to detect a stop motion of the wearable device by calling a subroutine for detecting the stop motion.

15. The system according to claim 14, wherein:
based on a detection result of the movements, the up-down and twist movement detection submodule changes the value of the detection state;
based on the value of the detection state, the stop motion detection submodule determines whether the stop motion is detected; and
based on a detection result of the stop motion, the stop motion detection submodule changes the value of the detection state.

16. The system according to claim 14, wherein the up-down and twist movement detection submodule is further configured to:
calculate a current angle;
obtain the current angle preprocessed by a low pass filter;
compare an algebraic sign of a difference between the updated angle and an old angle with an algebraic sign of an accumulated sum of change of the angle;
when the algebraic sign of the difference between the updated angle and the old angle is the same as the algebraic sign of the accumulated sum of the change of the angle, add the difference between the updated angle and the old angle to the accumulated sum of the change of the angle to obtain a new accumulated sum and determine whether an absolute value of the new accumulated sum of the change of the angle is greater than a predefined movement threshold; and
when the algebraic sign of the difference between the updated angle and the old angle is different from the algebraic sign of the accumulated sum of change of the angle, determine whether the absolute value of the accumulated sum of the change of the angle is greater than a predefined threshold.

17. The system according to claim 16, wherein:
when the absolute value of the new accumulated sum of the change of the angle is greater than the predefined movement threshold, the value of the detection state is changed to 1; and
when the absolute value of the new accumulated sum of the change of the angle is not greater than the pre-defined movement threshold, the subroutine for detecting the up-down and twist movements is exited.

18. The system according to claim 16, wherein:
when the absolute value of the accumulated sum of the change of the angle is greater than the predefined threshold, the value of the detection state is changed to 2; and
when the absolute value of the accumulated sum of the change of the angle is not greater than the predefined threshold, the subroutine for detecting the up-down and twist movements is exited.

19. The system according to claim 14, wherein the stop motion detection submodule is further configured to:
determine whether an absolute value of acceleration on an X axis is greater than a predefined value;
when the absolute value of the acceleration on the X axis is not greater than the predefined value, decrease a waiting period by 1 and detect whether the decreased waiting period is not greater than 0, wherein:
when the decreased waiting period is not greater than 0, the value of the detection state is set to 3; and
when the decreased waiting period is greater than 0, the subroutine for detecting the stop motion is exited; and
when the absolute value of the acceleration on the X axis is greater than the predefined value, reset the value of the detection state to 0 and reset the waiting period to an initial value.

20. The system according to claim 11, wherein:
when the motion information indicates the lookup gesture, the function for turning on the display screen of the wearable device corresponding to the lookup gesture is performed.

\* \* \* \* \*